US012598221B2

(12) United States Patent
Mao et al.

(10) Patent No.: US 12,598,221 B2
(45) Date of Patent: Apr. 7, 2026

(54) CALL PROCESSING METHOD AND CALL PROCESSING APPARATUS

(71) Applicant: VIVO MOBILE COMMUNICATION CO., LTD., Guangdong (CN)

(72) Inventors: Yuanze Mao, Guangdong (CN); Zhonghuang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 54 days.

(21) Appl. No.: 18/613,523

(22) Filed: Mar. 22, 2024

(65) Prior Publication Data

US 2025/0016205 A1     Jan. 9, 2025

Related U.S. Application Data

(63) Continuation of application No. PCT/CN2022/119367, filed on Sep. 16, 2022.

(30) Foreign Application Priority Data

Sep. 22, 2021     (CN) .......................... 202111108025.X

(51) Int. Cl.
| | |
|---|---|
| *H04L 65/1016* | (2022.01) |
| *H04L 65/1046* | (2022.01) |
| *H04L 65/1069* | (2022.01) |
| *H04L 65/1104* | (2022.01) |
| *H04M 3/487* | (2006.01) |

(52) U.S. Cl.
CPC ...... *H04L 65/1016* (2013.01); *H04L 65/1046* (2013.01); *H04L 65/1069* (2013.01); *H04L 65/1104* (2022.05); *H04M 3/487* (2013.01)

(58) Field of Classification Search
CPC ............. H04L 65/1016; H04L 65/1104; H04L 65/1046; H04L 65/1069; H04M 3/487
USPC ........................................................ 709/224
See application file for complete search history.

(56) References Cited

U.S. PATENT DOCUMENTS

| | | | | |
|---|---|---|---|---|
| 9,699,718 | B2 * | 7/2017 | Ramachandran | ..... H04W 48/18 |
| 2007/0058558 | A1 | 3/2007 | Cheung | |
| 2012/0127960 | A1 | 5/2012 | Lei | |

FOREIGN PATENT DOCUMENTS

| | | | | |
|---|---|---|---|---|
| CN | 101068155 | A | 11/2007 | |
| CN | 101547143 | A * | 9/2009 | ........... H04L 65/612 |
| CN | 101742592 | A | 6/2010 | |
| CN | 102474789 | A | 5/2012 | |

(Continued)

OTHER PUBLICATIONS

Extended European Search Report for Application No. 22871894.6, dated Dec. 2, 2024, 12 Pages.

(Continued)

*Primary Examiner* — Glenford J Madamba
(74) *Attorney, Agent, or Firm* — BROOKS KUSHMAN P.C.

(57)     ABSTRACT

A call processing method and a call processing apparatus. The call processing method is used for a terminal. The method includes: receiving a voice data packet sent by a network server; and sending first signaling to the network server in a case that the voice data packet is abnormal, where the first signaling is used to enable the network server to switch at least one of: a media server that generates the voice data packet and a domain for transmitting the voice data packet.

16 Claims, 3 Drawing Sheets

(56)　　　　　　　References Cited

FOREIGN PATENT DOCUMENTS

| CN | 105897462 | A | | 8/2016 | | |
|----|-----------|---|---|--------|---|---|
| CN | 106341409 | A | | 1/2017 | | |
| CN | 113271639 | A | * | 8/2021 | ............ | H04L 65/65 |
| EP | 2839696 | B1 | | 8/2018 | | |

OTHER PUBLICATIONS

3GPP A Global Inititiative "3rd Generation Partnership Project; Technical Specification Group Services and Systems Aspects; Network architecture (Release 17)" 3GPP TS 23.002 V17.0.0 (Mar. 2021), 2021, 114 Pages.
3GPP A Global Inititiative "3rd Generation Partnership Project; Technical Specification Group Services and System Aspects; Single Radio Voice Call Continuity (SRVCC); Stage 2 (Release 15)" 3GPP TS 23.216 V15.3.0 (Sep. 2019), 2019, 69 Pages.
International Search Report and Written Opinion for Application No. PCT /CN2022/119367, dated Dec. 7, 2022, 6 Pages.

* cited by examiner

CALL PROCESSING METHOD AND CALL PROCESSING APPARATUS

CROSS-REFERENCE TO RELATED APPLICATIONS

This application is a continuation of International Application No. PCT/CN2022/119367 filed on Sep. 16, 2022, which claims priority to Chinese Patent Application No. 202111108025.X filed on Sep. 22, 2021, which are incorporated herein by reference in their entireties.

TECHNICAL FIELD

This application pertains to the field of data call technologies, and specifically relates to a call processing method and a call processing apparatus.

BACKGROUND

In related technologies, in a case that an IMS call occurs in cases such as a poor network environment and an abnormal audio encryption/decryption algorithm, problems such as an intermediate call or a silent call are caused, affecting call quality.

SUMMARY

Embodiments of this application aim to provide a call processing method and a call processing apparatus.

According to a first aspect, an embodiment of this application provides a call processing method, applied to a terminal, where the method includes:

receiving a voice data packet sent by a network server; and sending first signaling to the network server in a case that the voice data packet is abnormal, where the first signaling is used to enable the network server to switch at least one of: a media server that generates the voice data packet and a domain for transmitting the voice data packet.

According to a second aspect, an embodiment of this application provides a call processing method, applied to a network server, where the method includes:

receiving a call data packet sent by a terminal;

generating a corresponding voice data packet according to the call data packet, and sending the voice data packet to the terminal; and in a case that first signaling sent by the terminal is received, switching at least one of: a media server that generates the voice data packet and a domain for transmitting the voice data packet.

According to a third aspect, an embodiment of this application provides a call processing apparatus, including:

a first receiving module, configured to receive a voice data packet sent by a network server; and a first sending module, configured to send first signaling to the network server in a case that the voice data packet is abnormal, where the first signaling is used to enable the network server to switch at least one of: a media server that generates the voice data packet and a domain for transmitting the voice data packet.

According to a fourth aspect, an embodiment of this application provides a call processing apparatus, including:

a second receiving module, configured to receive a call data packet sent by a terminal;

a second sending module, configured to: generate a corresponding voice data packet according to the call data packet, and send the voice data packet to the terminal; and a switch module, configured to: in a case that first signaling sent by the terminal is received, switch at least one of: a media server that generates the voice data packet and a domain for transmitting the voice data packet.

According to a fifth aspect, an embodiment of this application provides a first electronic device, including a processor, a memory, and a program or an instruction that is stored in the memory and that can be run on the processor, where when the program or the instruction is executed by the processor, the steps of the method according to the first aspect are implemented.

According to a sixth aspect, an embodiment of this application provides a second electronic device, including a processor, a memory, and a program or an instruction that is stored in the memory and that can be run on the processor, where when the program or the instruction is executed by the processor, the steps of the method according to the second aspect are implemented.

According to a seventh aspect, an embodiment of this application provides a readable storage medium, where the readable storage medium stores a program or an instruction, and when the program or the instruction is executed by a processor, the steps of the methods according to the first aspect and the second aspect are implemented.

According to an eighth aspect, an embodiment of this application provides a chip, where the chip includes a processor and a communication interface, the communication interface is coupled to the processor, and the processor is configured to run a program or an instruction to implement the steps of the methods according to the first aspect and the second aspect.

In the embodiments of this application, the terminal may be a calling terminal or a called terminal for an IMS call, and the terminal making the IMS call collects call voice of a user by using a microphone, forms the call voice into the call data packet, and sends the call data packet to the network server, and at the same time, receives the voice data packet that includes call voice of a peer terminal of the call and that is sent by the network server.

DETAILED DESCRIPTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the following describes, in detail based on specific embodiments and application scenarios, a call processing method and a call processing apparatus provided in the embodiments of this application.

Figures 1, 2:
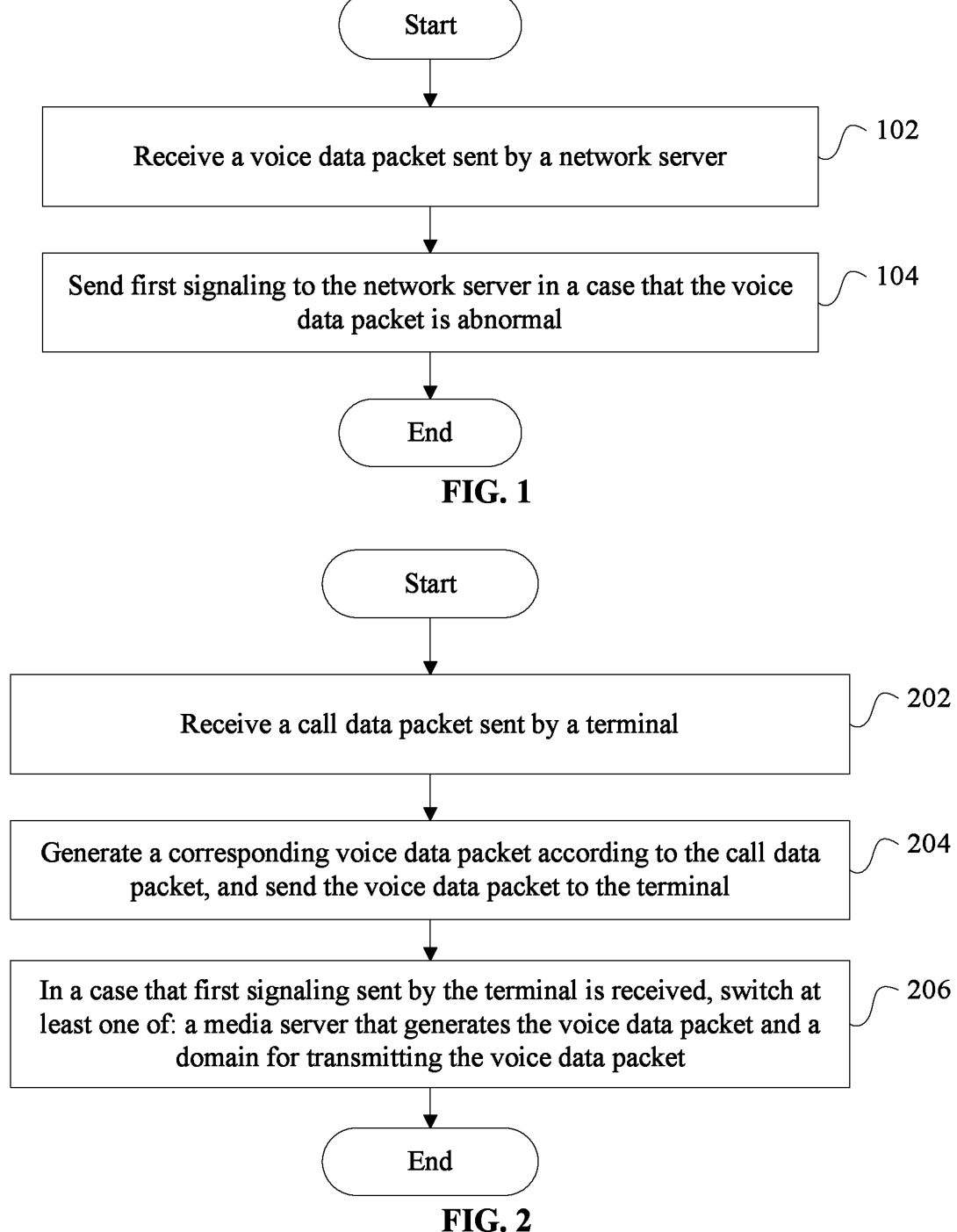
FIG. 1 is a first flowchart of a call processing method according to an embodiment of this application.
FIG. 2 is a second flowchart of a call processing method according to an embodiment of this application.

A call processing method is provided in some embodiments of this application. FIG. 1 is a first flowchart of a call processing method according to an embodiment of this application. As shown in FIG. 1, the method includes:

Step 102: Receive a voice data packet sent by a network server.

Step 104: Send first signaling to the network server in a case that the voice data packet is abnormal.

The first signaling is used to enable the network server to switch at least one of: a media server that generates the voice data packet and a domain for transmitting the voice data packet.

In this embodiment of this application, a terminal may be a calling terminal or a called terminal for an IMS call, and the terminal making the IMS call collects call voice of a user by using a microphone, forms the call voice into a call data packet, and sends the call data packet to the network server, and at the same time, receives the voice data packet that includes call voice of a peer terminal of the call and that is sent by the network server.

After receiving the voice data packet, the terminal parses the voice data packet, and detects, by using a sound module, whether call voice parsed out is abnormal, for example, the call voice is silent or noisy. If the call voice is silent, noisy, or the like, it is determined that the voice data packet is abnormal. In this case, the first signaling is generated and sent to the network server. The first signaling is used to notify the network server that the voice data packet is abnormal. In some implementations, the first signaling is a SIP signaling, where the SIP signaling is session initialization protocol (SIP) signaling.

After receiving the first signaling, the network server switches a generation manner of the voice data packet and/or a transmission manner of the voice data packet, for example, switches the media server that generates the voice data packet, so as to generate the voice data packet by using a new media server, and avoid a call abnormality caused by an abnormality of an audio encryption/decryption algorithm of the media server, or switches the domain for transmitting the voice data packet, for example, switches from a PS domain to a CS domain, to avoid a call abnormality caused by an abnormality of a domain-specific network, thereby effectively reducing occurrence of problems such as a silent call, and improving call efficiency and call experience.

In some embodiments of this application, the media server that generates the voice data packet includes: a first media server that generates the voice data packet; or a second media server that generates the voice data packet.

In this embodiment of this application, the network server receives the call data packet from the terminal and sends the call data packet to a corresponding media server. The media server parses and encapsulates the call data packet, to obtain the corresponding voice data packet.

Different media servers may have different audio encryption/decryption algorithms. Therefore, if the voice data packet received by the terminal is abnormal, a first media server currently responsible for processing the voice call of the terminal may be abnormal. In this case, the network server may switch from generating the voice data packet by using the first media server to generating the voice data packet by using a second media server, so as to rule out the possibility that the abnormality of the algorithm of the first media server causes the call abnormality.

The first media server includes a media server currently responsible for processing a voice call service of the terminal, or a preset first choice media server. The second media server includes a candidate media server other than the first media server, or a preset second choice media server.

The media server that processes and generates the voice data packet is switched to effectively rule out the call abnormality caused by the abnormality of the encryption/decryption algorithm of the media server, thereby improving call efficiency.

In some embodiments of this application, the domain for transmitting the voice data packet includes: a PS domain for transmitting the voice data packet; or a CS domain for transmitting the voice data packet.

In this embodiment of this application, in related technologies, IMS calls are based on the SIP protocol, and a call service is generally carried out by default through the PS domain connected based on the transmission control protocol/internet protocol (TCP/IP), that is, related data packet transmission is performed through the PS domain. As a network environment of an environment in which the terminal is located changes, cases such as a poor network environment and a packet loss on the PS domain may occur, resulting in an abnormality of the voice data packet received by the terminal.

Therefore, after the first signaling of the terminal is received, the transmission manner of the voice data packet and the call data packet between the terminal and the network server may be switched from transmission through the PS domain to transmission through the CS domain, so as to rule out the call abnormality caused by the abnormality of a domain-specific network, thereby improving call efficiency.

In some embodiments of this application, after the sending first signaling to the network server, the method further includes:

receiving second signaling sent by the network server, where the second signaling includes at least one of: a switched media server that generates the voice data packet and a switched domain for transmitting the voice data packet; and in a case that the second signaling includes the switched domain for transmitting the voice data packet, receiving the voice data packet and sending the call data packet according to a transmission manner indicated by the second signaling, where the voice data packet is generated according to the call data packet.

In this embodiment of this application, after the terminal sends the first signaling to the network server to notify the network server that the received voice data packet is abnormal, the network server performs a corresponding operation, to switch a media server that processes the voice data packet or switch a transmission manner of the voice data packet. After performing the operation, the network server replies the second signaling to the terminal, where the second signaling is used to notify the terminal that the media server has been switched, or notify the terminal that the transmission manner has been switched.

In a case that the network server switches the transmission manner of the voice data packet, the terminal switches, according to an indication of the second signaling, a transmission manner of the call data packet by the terminal, and also changes the manner to receiving and sending the data packet through the CS domain, to adapt to switching of the data packet transmission mode. The call data packet is a data packet obtained through processing by the current terminal based on received user voice. The data packet is processed by the media server to generate the corresponding voice data packet, and the voice data packet is transmitted to the peer terminal of the voice call, and is decapsulated and decoded by the peer terminal for play.

It can be understood that, terminals of two or more parties exist for the voice call, including at least one calling party terminal, and at least one called party terminal. When sending the second signaling, the network server may simultaneously send the second signaling to all terminals participating in the voice call.

A call processing method is provided in some embodiments of this application, and is used in a network server. FIG. 2 is a second flowchart of a call processing method according to an embodiment of this application. As shown in FIG. 2, the method includes:

Step 202: Receive a call data packet sent by a terminal.

Step 204: Generate a corresponding voice data packet according to the call data packet, and send the voice data packet to the terminal.

Step 206: In a case that first signaling sent by the terminal is received, switch at least one of: a media server that generates the voice data packet and a domain for transmitting the voice data packet.

In this embodiment of this application, in a process in which the terminal makes the voice call, the network server receives, in real time, the call data packet generated by the terminal according to call voice collected by a microphone of the terminal, and processes the call data packet based on the encryption/decryption algorithm of the media server, generates the corresponding voice data packet, and sends the voice data packet to the peer terminal that makes the voice call.

In this process, if the network server receives the first signaling of the terminal, it indicates that the voice data packet received by the terminal is abnormal, resulting in a silent call or noise of the call. In this case, the network server rules out the reason for the abnormality of the voice data packet by switching the generation manner of the voice data packet and/or switching the transmission manner of the voice data packet.

Specifically, the network server parses and encapsulates the call data packet by using the media server, to obtain the corresponding voice data packet. Different media servers may have different audio encryption/decryption algorithms. Therefore, if an algorithm of the media server currently responsible for processing the voice call of the terminal is abnormal, the voice data packet is abnormal.

In this case, the media server that generates the voice data packet is switched to rule out the call abnormality caused by the abnormality of the algorithm of the first media server.

On this basis, the voice call is made through the PS domain by default. When cases such as a poor network environment and a packet loss on the PS domain occur, the voice data packet received by the terminal is abnormal. In this case, the transmission manner of the voice data packet and the call data packet between the terminal and the network server is switched from transmission through the PS domain to transmission through the CS domain, to rule out the call abnormality caused by the abnormality of a domain-specific network, thereby improving call efficiency.

In some embodiments of this application, the receiving a call data packet sent by a terminal includes:

receiving, through a PS domain, the call data packet sent by the terminal;

the sending the voice data packet to the terminal includes:

sending, through the PS domain, the voice data packet to the terminal; and the switching at least one of: a media server that generates the voice data packet and a domain for transmitting the voice data packet includes:

receiving, through a CS domain, the call data packet sent by the terminal, and sending the voice data packet to the terminal through the CS domain.

In this embodiment of this application, the network server receives, through the PS domain by default, the call data packet sent by the terminal, and sends the voice data packet to the terminal through the PS domain. After receiving the first signaling, the network server may select to switch the transmission manner of the data packet between the network server and the terminal, and specifically, switch receiving and sending the data packet through the PS domain to receiving and sending the data packet through the CS domain.

After switching, the network server receives, through the CS domain, the call data packet sent by the terminal, and sends the voice data packet to the terminal through the CS domain. The transmission manner of receiving and sending the data packet is switched to effectively rule out the call abnormality caused by the abnormality of a domain-specific network, thereby improving call efficiency.

In some embodiments of this application, the receiving, through a CS domain, the call data packet sent by the terminal, and sending the voice data packet to the terminal through the CS domain includes:

sending a first release instruction to a first network element corresponding to the PS domain, where the first release instruction is used to enable the first network element to release a network resource;

receiving first reply information sent by the first network element, where the first reply information corresponds to the first release instruction; and sending preset information in a case that the first reply information is received, to switch a transmission manner of the call data packet of the terminal to the CS domain for transmission.

In this embodiment of this application, when a transmission path of receiving and sending the data packet is switched from the PS domain to the CS domain, first, the network element sends the first release instruction to a related network element of the PS domain, that is, the first network element, to notify the first network element that the current call service is to be switched to the CS domain, and at the same time, the related network element of the PS domain releases the network resource.

After the first network element related to the PS domain releases the network resource according to the first release instruction, the first network element sends the first reply information corresponding to the first release instruction to the network server, to notify the network server that the first network element has released the resource, and that the first network element can switch the call service to the CS domain. In this case, the network server completes switching the call service from the PS domain to the CS domain by sending the preset information, and the subsequent call service is carried out through the CS domain, so as to rule out the call abnormality caused by a network abnormality and a packet loss of the PS domain, thereby improving call efficiency.

In some embodiments of this application, the preset information includes second signaling, and the sending preset information includes: sending the second signaling to the terminal, where the second signaling is used to indicate a switched transmission manner of the voice data packet.

In this technical solution, the preset information specifically includes the second signaling, where the second signaling is used to indicate to switch a transmission path of the data packet, that is, switch the domain for carrying out the call service. In some implementations, the second signaling is further used to notify the terminal to switch the media server.

After receiving the second signaling, the terminal switches, according to the second signaling, the path of receiving and sending the data packet by the terminal, and specifically, switches from the PS domain to the CS domain, so as to rule out the call abnormality caused by a network abnormality and a packet loss of the PS domain, thereby improving call efficiency.

In some embodiments of this application, the preset information includes a CS call instruction, and the sending preset information includes: sending the CS call instruction to a second network element corresponding to the CS domain, where the CS call instruction is used to enable the second network element to send CS call signaling to the terminal, and the CS call signaling is used to switch the transmission manner of the call data packet of the terminal to the CS domain for transmission.

In this embodiment of this application, the preset information specifically includes the CS call instruction. After receiving the first reply information sent by the first network element related to the PS domain, the network server sends the CS call instruction to the second network element related to the CS domain, to notify the second network element of the CS domain that the call service is to be switched to the CS domain, and then the second network element of the CS domain forwards corresponding signaling to both terminals of the voice call service, so that the terminal switches to the CS domain to receive and send the data packet.

After receiving the signaling, the terminal switches the transmission manner of the data packet from the PS domain to the CS domain, so as to rule out the call abnormality caused by a network abnormality and a packet loss of the PS domain, thereby improving call efficiency.

In some embodiments of this application, the generating a corresponding voice data packet according to the call data packet includes: sending the call data packet to a first media server, and receiving the voice data packet sent by the first media server; and the switching at least one of: a media server that generates the voice data packet and a domain for transmitting the voice data packet includes: sending the call data packet to a second media server, and receiving the voice data packet sent by the second media server.

In this embodiment of this application, the network server receives the call data packet from the terminal and sends the call data packet to a corresponding media server. The media server parses and encapsulates the call data packet, to obtain the corresponding voice data packet.

Different media servers may have different audio encryption/decryption algorithms. Therefore, if the first signaling sent by the terminal is received, an algorithm of a first media server currently responsible for processing the voice call of the terminal may be abnormal, resulting in an abnormality of the voice data packet received by the terminal. In this case, the network server switches the generation manner of the voice data packet from generating the voice data packet by using the first media server to generating the voice data packet by using a second media server, so as to rule out the possibility that the abnormality of the algorithm of the first media server causes the call abnormality.

The first media server includes a media server currently responsible for processing a voice call service of the terminal, or a preset first choice media server. The second media server includes a candidate media server other than the first media server, or a preset second choice media server.

The media server that processes and generates the voice data packet is switched to effectively rule out the call abnormality caused by the abnormality of the encryption/decryption algorithm of the media server, thereby improving call efficiency.

In some embodiments of this application, the sending the call data packet to a second media server includes:

sending a second release instruction to the first media server, where the second release instruction is used to enable the first media server to release a network resource;

receiving second reply information sent by the first media server, where the second reply information corresponds to the second release instruction;

sending third signaling to the second media server in a case that the second reply information is received, where the third signaling is used to enable the second media server to get ready for receiving the call data packet;

receiving third reply information sent by the second media server, where the third reply information corresponds to the third signaling; and sending the call data packet to the second media server in a case that the third reply information is received.

In this embodiment of this application, the generation manner of the voice data packet is specifically switched in the following manner: generating the voice data packet by using the first media server is switched to generating the voice data packet by using the second media server. Specifically, the network server sends the second release instruction to the first media server, to notify the first media server that the first media server is to be switched to another media server to carry out the call service. After receiving the second release instruction, the first media server ends the corresponding call service, and releases the corresponding network resource.

After the network resource is released, the first media server replies the corresponding second reply information to the network server, to notify the network server that the network resource has been released, and that the network server can switch the call service to the new media server. In this case, the network server sends the third signaling to the second media server, and at the same time, the second media server prepares to receive and process the call data packet of the call service.

After receiving the third signaling, the second media server starts to prepare to receive the data packet, and establishes a corresponding call service. After getting ready, the second media server feeds back the third reply information corresponding to the third signaling to the network server. In this case, switching of the media server is completed, and the call data packet subsequently received by the network server is sent to the second media server, and the second media server processes the call data packet, and generates the voice data packet.

In this application, the media server that generates the voice data packet is switched to rule out the call abnormality caused by the abnormality of the algorithm of the first media server.

Figure 3:
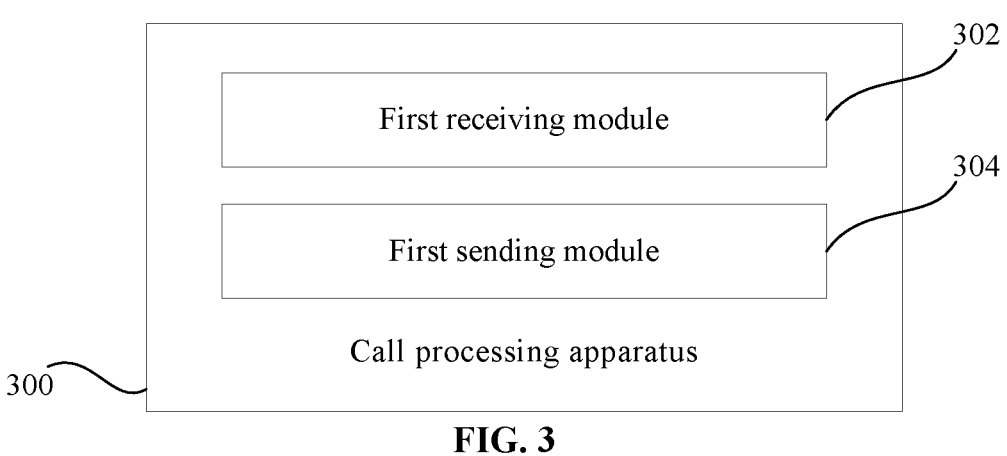
FIG. 3 is a first structural block diagram of a call processing apparatus according to an embodiment of this application.

A call processing apparatus is provided in some embodiments of this application, and is used in a terminal. FIG. 3 is a first schematic structural diagram of a call processing apparatus according to an embodiment of this application. As shown in FIG. 3, the call processing apparatus 300 includes:

a first receiving module 302, configured to receive a voice data packet sent by a network server; and a first sending module 304, configured to send first signaling to the network server in a case that the voice data packet is abnormal, where the first signaling is used to enable the network server to switch at least one of: a media server that generates the voice data packet and a domain for transmitting the voice data packet.

In this embodiment of this application, a terminal may be a calling terminal or a called terminal for an IMS call, and the terminal making the IMS call collects call voice of a user by using a microphone, forms the call voice into a call data packet, and sends the call data packet to the network server, and at the same time, receives the voice data packet that includes call voice of a peer terminal of the call and that is sent by the network server.

After receiving the voice data packet, the terminal parses the voice data packet, and detects, by using a sound module, whether call voice parsed out is abnormal, for example, the call voice is silent or noisy. If the call voice is silent, noisy, or the like, it is determined that the voice data packet is abnormal. In this case, the first signaling is generated and sent to the network server. The first signaling is used to notify the network server that the voice data packet is abnormal. In some implementations, the first signaling is a SIP signaling, where the SIP signaling is session initialization protocol (SIP) signaling.

After receiving the first signaling, the network server switches a generation manner of the voice data packet and/or a transmission manner of the voice data packet, for example, switches the media server that generates the voice data packet, so as to generate the voice data packet by using a new media server, and avoid a call abnormality caused by an abnormality of an audio encryption/decryption algorithm of the media server, or switches the domain for transmitting the voice data packet, for example, switches from a PS domain to a CS domain, to avoid a call abnormality caused by an abnormality of a domain-specific network, thereby effectively reducing occurrence of problems such as a silent call, and improving call efficiency and call experience.

In some embodiments of this application, the media server that generates the voice data packet includes: a first media server that generates the voice data packet; or a second media server that generates the voice data packet.

In this embodiment of this application, the media server that processes and generates the voice data packet is switched to effectively rule out the call abnormality caused by the abnormality of the encryption/decryption algorithm of the media server, thereby improving call efficiency.

In some embodiments of this application, the domain for transmitting the voice data packet includes: a PS domain for transmitting the voice data packet; or a CS domain for transmitting the voice data packet.

In this embodiment of this application, after the first signaling of the terminal is received, the transmission manner of the voice data packet and the call data packet between the terminal and the network server may be switched from transmission through the PS domain to transmission through the CS domain, to rule out the call abnormality caused by the abnormality of a domain-specific network, thereby improving call efficiency.

In some embodiments of this application, the first receiving module is further configured to: receive second signaling sent by the network server, where the second signaling includes at least one of: a switched media server that generates the voice data packet and a switched domain for transmitting the voice data packet; and in a case that the second signaling includes the switched domain for transmitting the voice data packet, receive the voice data packet and send the call data packet according to a transmission manner indicated by the second signaling, where the voice data packet is generated according to the call data packet.

In this embodiment of this application, after the terminal sends the first signaling to the network server to notify the network server that the received voice data packet is abnormal, the network server performs a corresponding operation, to switch a media server that processes the voice data packet or switch a transmission manner of the voice data packet. After performing the operation, the network server replies the second signaling to the terminal, where the second signaling is used to notify the terminal that the media server has been switched, or notify the terminal that the transmission manner has been switched.

Figure 4:
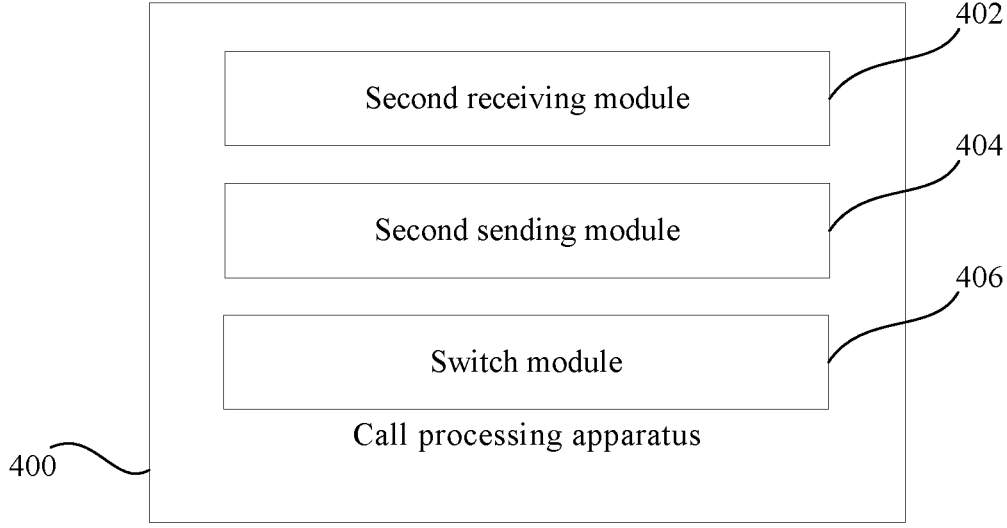
FIG. 4 is a second structural block diagram of a call processing apparatus according to an embodiment of this application.

A call processing apparatus is provided in some embodiments of this application, and is used in a network server. FIG. 4 is a second schematic structural diagram of a call processing apparatus according to an embodiment of this application. As shown in FIG. 4, the call processing apparatus 400 includes:

a second receiving module 402, configured to receive a call data packet sent by a terminal;

a second sending module 404, configured to: generate a corresponding voice data packet according to the call data packet, and send the voice data packet to the terminal; and a switch module 406, configured to: in a case that first signaling sent by the terminal is received, switch at least one of: a media server that generates the voice data packet and a domain for transmitting the voice data packet.

In this embodiment of this application, in a process in which the terminal makes the voice call, the network server receives, in real time, the call data packet generated by the terminal according to the call voice collected by the microphone of the terminal, and processes the call data packet by using the encryption/decryption algorithm of the media server, to generate the corresponding voice data packet, and sends the voice data packet to the peer terminal of the voice call.

In this process, if the network server receives the first signaling of the terminal, it indicates that the voice data packet received by the terminal is abnormal, resulting in a silent call or noise of the call. In this case, the network server rules out the reason for the abnormality of the voice data packet by switching the generation manner of the voice data packet and/or switching the transmission manner of the voice data packet.

Specifically, the network server parses and encapsulates the call data packet by using the media server, to obtain the corresponding voice data packet. Different media servers may have different audio encryption/decryption algorithms. Therefore, if an algorithm of the media server currently responsible for processing the voice call of the terminal is abnormal, the voice data packet is abnormal.

In this case, the media server that generates the voice data packet is switched to rule out the call abnormality caused by the abnormality of the algorithm of the first media server.

On this basis, the voice call is made through the PS domain by default. When cases such as a poor network environment and a packet loss on the PS domain occur, the voice data packet received by the terminal is abnormal. In this case, the transmission manner of the voice data packet and the call data packet between the terminal and the network server is switched from transmission through the PS domain to transmission through the CS domain, to rule out the call abnormality caused by the abnormality of a domain-specific network, thereby improving call efficiency.

In some embodiments of this application, the second receiving module is further configured to receive, through a PS domain, the call data packet sent by the terminal;

the second sending module is further configured to send, through the PS domain, the voice data packet to the terminal; and the second receiving module is further configured to: receive, through a CS domain, the call data packet sent by the terminal, and send the voice data packet to the terminal through the CS domain.

In this embodiment of this application, the network server receives, through the PS domain by default, the call data packet sent by the terminal, and sends the voice data packet to the terminal through the PS domain. After the first signaling is received, the transmission manner of the data packet between the network server and the terminal is switched, the voice data packet sent by the terminal is received through the CS domain, and the voice data packet is sent to the terminal through the CS domain. The transmission manner of receiving and sending the data packet is switched to effectively rule out the call abnormality caused by the abnormality of a domain-specific network, thereby improving call efficiency.

In some embodiments of this application, the second sending module is further configured to send a first release instruction to a first network element corresponding to the PS domain, where the first release instruction is used to enable the first network element to release a network resource;

the second receiving module is further configured to receive first reply information sent by the first network element, where the first reply information corresponds to the first release instruction; and the second sending module is further configured to: send preset information in a case that the first reply information is received, to switch a transmission manner of the call data packet of the terminal to the CS domain for transmission.

In this embodiment of this application, when a transmission path of receiving and sending the data packet is switched from the PS domain to the CS domain, first, the network element sends the first release instruction to a related network element of the PS domain, that is, the first network element, to notify the first network element that the current call service is to be switched to the CS domain, and at the same time, the related network element of the PS domain releases the network resource.

After the first network element related to the PS domain releases the network resource according to the first release instruction, the first network element sends the first reply information corresponding to the first release instruction to the network server, to notify the network server that the first network element has released the resource, and that the first network element can switch the call service to the CS domain. In this case, the network server completes switching the call service from the PS domain to the CS domain by sending the preset information, and the subsequent call service is carried out through the CS domain, so as to rule out the call abnormality caused by a network abnormality and a packet loss of the PS domain, thereby improving call efficiency.

In some embodiments of this application, the preset information includes second signaling, and the second sending module is further configured to send the second signaling to the terminal, where the second signaling is used to indicate a switched transmission manner of the voice data packet.

In this technical solution, the preset information specifically includes the second signaling, where the second signaling is used to indicate the terminal to switch a transmission path of the data packet, that is, switch the domain for carrying out the call service. In some implementations, the second signaling is further used to notify the terminal to switch the media server.

After receiving the second signaling, the terminal switches, according to the second signaling, the path of receiving and sending the data packet by the terminal, and specifically, switches from the PS domain to the CS domain, so as to rule out the call abnormality caused by a network abnormality and a packet loss of the PS domain, thereby improving call efficiency.

In some embodiments of this application, the preset information includes a CS call instruction, and the second sending module is further configured to send the CS call instruction to a second network element corresponding to the CS domain, where the CS call instruction is used to enable the second network element to send CS call signaling to the terminal, and the CS call signaling is used to switch the transmission manner of the call data packet of the terminal to the CS domain for transmission.

In this embodiment of this application, the preset information specifically includes the CS call instruction. After receiving the first reply information sent by the first network element related to the PS domain, the network server sends the CS call instruction to the second network element related to the CS domain, to notify the second network element of the CS domain that the call service is to be switched to the CS domain, and then the second network element of the CS domain forwards corresponding signaling to both terminals of the voice call service, so that the terminal switches to the CS domain to receive and send the data packet.

After receiving the signaling, the terminal switches the transmission manner of the data packet from the PS domain to the CS domain, so as to rule out the call abnormality caused by a network abnormality and a packet loss of the PS domain, thereby improving call efficiency.

In some embodiments of this application, the second sending module is further configured to: send the call data packet to a first media server, and receive the voice data packet sent by the first media server; and send the call data packet to a second media server, and receive the voice data packet sent by the second media server.

In this embodiment of this application, the media server that processes and generates the voice data packet is switched to effectively rule out the call abnormality caused by the abnormality of the encryption/decryption algorithm of the media server, thereby improving call efficiency.

In some embodiments of this application, the second sending unit is further configured to send a second release instruction to the first media server, where the second release instruction is used to enable the first media server to release a network resource;

the second receiving unit is further configured to receive second reply information sent by the first media server, where the second reply information corresponds to the second release instruction;

the second sending unit is further configured to send third signaling to the second media server in a case that the second reply information is received, where the third signaling is used to enable the second media server to get ready for receiving the call data packet;

the second receiving unit is further configured to receive third reply information sent by the second media server, where the third reply information corresponds to the third signaling; and the second sending unit is further configured to send the call data packet to the second media server in a case that the third reply information is received.

In this embodiment of this application, the media server that generates the voice data packet is switched to rule out the call abnormality caused by the abnormality of the algorithm of the first media server.

The call processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The call processing apparatus in this embodiment of this application may be an apparatus with an operating system. The operating system may be an Android operating system, an iOS operating system, or another possible operating system. This is not specifically limited in this embodiment of this application.

The call processing apparatus provided in this embodiment of this application can implement each process implemented in the foregoing method embodiment. To avoid repetition, details are not described herein again.

Figure 5:
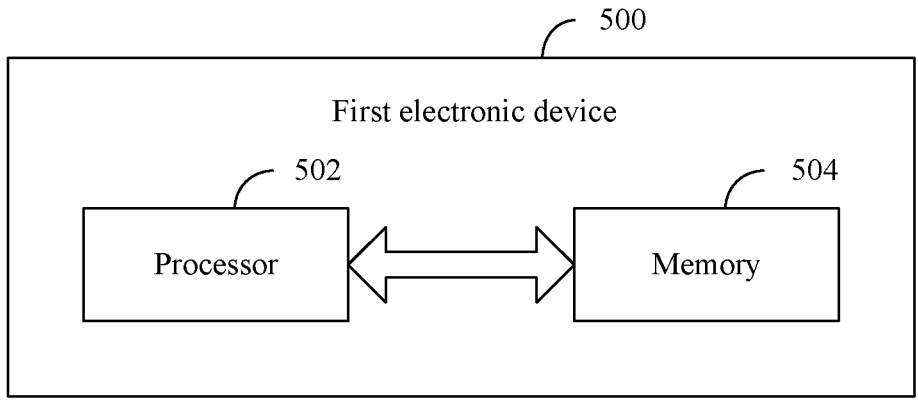
FIG. 5 is a structural block diagram of a first electronic device according to an embodiment of this application.

Optionally, an embodiment of this application further provides a first electronic device 500. FIG. 5 is a structural block diagram of a first electronic device according to an embodiment of this application. As shown in FIG. 5, the first electronic device includes: a processor 502, a memory 504, and a program or an instruction that is stored in the memory 504 and that can be run on the processor 502. When the program or the instruction is executed by the processor 502, each process of the call processing method used for the terminal in the foregoing method embodiment is implemented, and same technical effect can be achieved. To avoid repetition, details are not described herein again.

Figure 6:
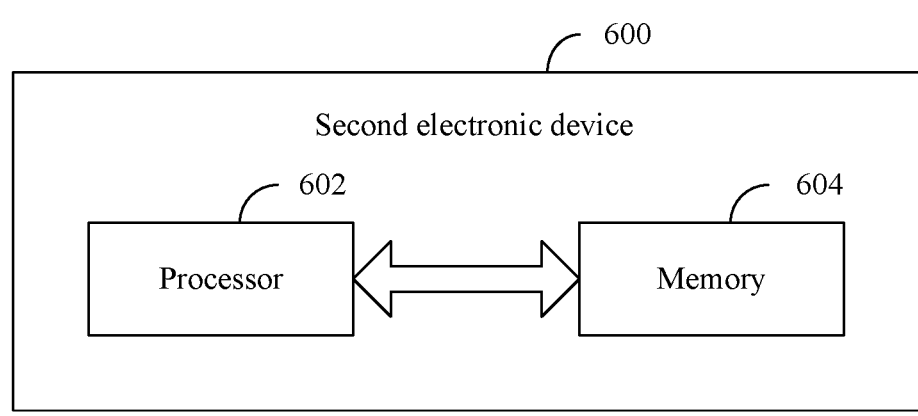
FIG. 6 is a structural block diagram of a second electronic device according to an embodiment of this application.

Optionally, an embodiment of this application further provides a second electronic device 600. FIG. 6 is a structural block diagram of a second electronic device according to an embodiment of this application. As shown in FIG. 6, the second electronic device includes: a processor 602, a memory 604, and a program or an instruction that is stored in the memory 604 and that can be run on the processor 602. When the program or the instruction is executed by the processor 602, each process of the call processing method used for the server in the foregoing method embodiment is implemented, and same technical effect can be achieved. To avoid repetition, details are not described herein again.

It should be noted that the electronic device in this embodiment of this application includes the foregoing mobile electronic device and the foregoing non-mobile electronic device.

Figure 7:
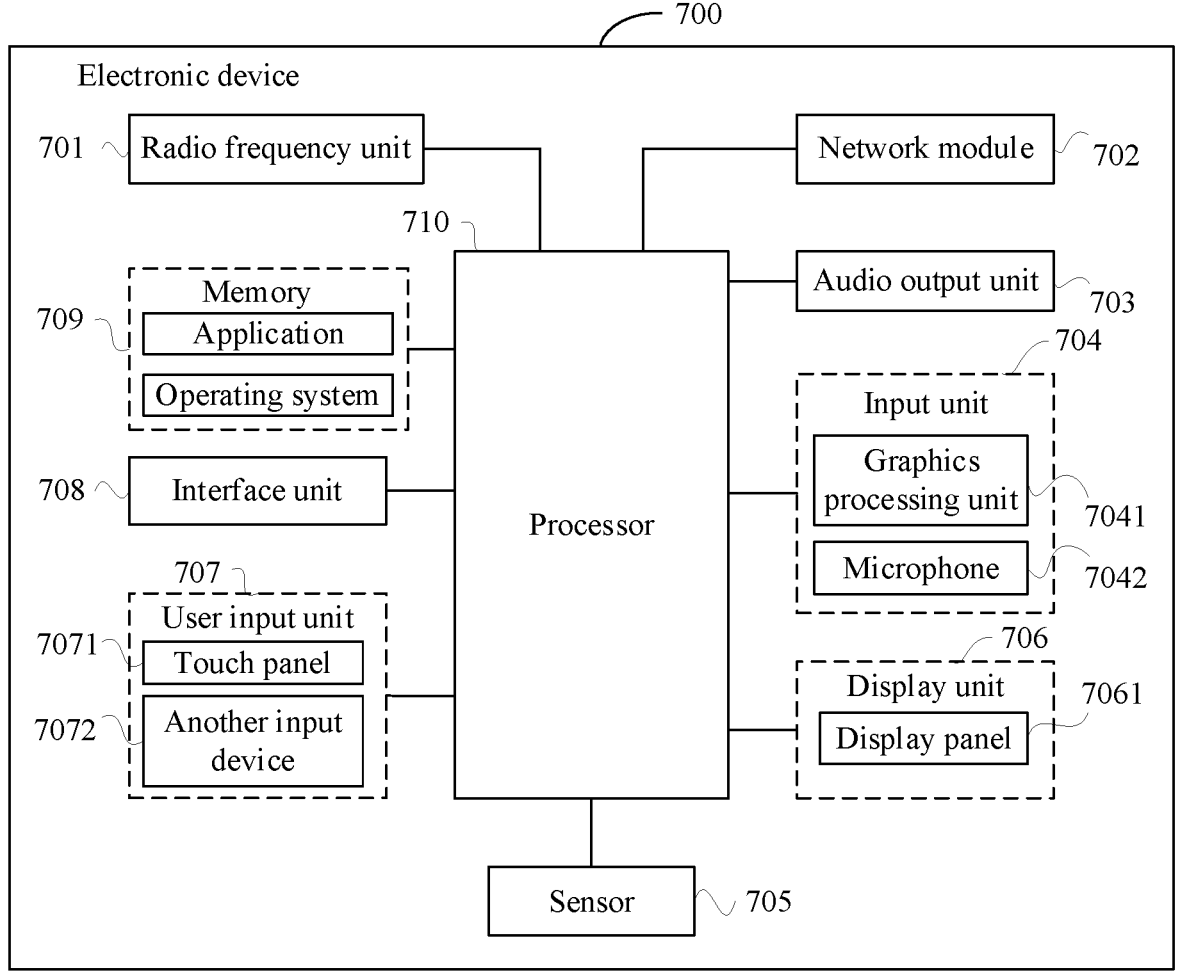
FIG. 7 is a schematic diagram of a hardware structure of an electronic device according to an embodiment of this application.

FIG. 7 is a schematic diagram of a hardware structure of an electronic device according to an embodiment of this application.

The electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to each component. The power supply may be logically connected to the processor 710 by using a power management system, to implement functions such as charging and discharging management, and power consumption management by using the power management system. A structure of the electronic device shown in FIG. 5 does not constitute a limitation on the electronic device, and the electronic device may include more or fewer parts than those shown in the figure, or combine some components, or have different component arrangements. Details are not described herein again.

In some implementations, the processor 710 is configured to: receive a voice data packet sent by a network server; and send first signaling to the network server in a case that the voice data packet is abnormal, where the first signaling is used to enable the network server to switch at least one of: a media server that generates the voice data packet and a domain for transmitting the voice data packet.

Optionally, a generation manner of the voice data packet includes: generating the voice data packet by using a first media server; or generating the voice data packet by using a second media server.

Optionally, a transmission manner of the voice data packet includes: transmitting the voice data packet through a PS domain; or transmitting the voice data packet through a CS domain.

Optionally, the processor 710 is further configured to receive second signaling sent by the network server, where the second signaling includes at least one of: a switched generation manner of the voice data packet and a switched transmission manner of the voice data packet; and in a case that the second signaling includes the switched transmission manner of the voice data packet, receive the voice data packet and send the call data packet according to a transmission manner indicated by the second signaling, where the voice data packet is generated according to the call data packet.

In some other implementations, the processor 710 is configured to: receive a call data packet sent by a terminal; generate a corresponding voice data packet according to the call data packet, and send the voice data packet to the terminal; and in a case that first signaling sent by the terminal is received, switch at least one of: a generation manner of the voice data packet and a transmission manner of the voice data packet.

Optionally, the processor 710 is further configured to: receive, through a PS domain, the call data packet sent by the terminal; send, through the PS domain, the voice data packet to the terminal; and receive, through a CS domain, the call data packet sent by the terminal, and send the voice data packet to the terminal through the CS domain.

Optionally, the processor 710 is further configured to send a first release instruction to a first network element corresponding to the PS domain, where the first release instruction is used to enable the first network element to release a network resource; receive first reply information sent by the first network element, where the first reply information corresponds to the first release instruction; and send preset information in a case that the first reply information is received, to switch a transmission manner of the call data packet of the terminal to the CS domain for transmission.

Optionally, the preset information includes second signaling, and the processor 710 is further configured to send the second signaling to the terminal, where the second signaling is used to indicate a switched media server that generates the voice data packet and a switched domain for transmitting the voice data packet.

Optionally, the preset information includes a CS call instruction, and the processor 710 is further configured to send the CS call instruction to a second network element corresponding to the CS domain, where the CS call instruction is used to enable the second network element to send CS call signaling to the terminal, and the CS call signaling is used to switch the transmission manner of the call data packet of the terminal to the CS domain for transmission.

Optionally, the processor 710 is further configured to: send the call data packet to a first media server, and receive the voice data packet sent by the first media server; and send the call data packet to a second media server, and receive the voice data packet sent by the second media server.

Optionally, the processor 710 is further configured to: send a second release instruction to the first media server, where the second release instruction is used to enable the first media server to release a network resource; receive second reply information sent by the first media server, where the second reply information corresponds to the second release instruction; send third signaling to the second media server in a case that the second reply information is received, where the third signaling is used to enable the second media server to get ready for receiving the call data packet; receive third reply information sent by the second media server, where the third reply information corresponds to the third signaling; and send the call data packet to the second media server in a case that the third reply information is received.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode.

The display unit 706 may include a display panel 7061. The display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein. The memory 709 may be configured to store a software program and various data, including but not limited to an application and an operating system. An application processor and a modem processor may be integrated into the processor 710, the application processor mainly processes an operating system, a user interface, an application, and the like, and the modem processor mainly processes wireless communication. It may be understood that, alternatively, the modem processor may not be integrated into the processor 710.

An embodiment of this application further provides a readable storage medium. The readable storage medium stores a program or an instruction. When the program or the instruction is executed by a processor, each process of the foregoing method embodiment is implemented, and same technical effect can be achieved. To avoid repetition, details are not described herein again.

The processor is the processor in the electronic device in the foregoing embodiment. The readable storage medium includes a computer-readable storage medium such as a read-only memory (ROM), a random access memory (RAM), a magnetic disk, a compact disc, or the like.

An embodiment of this application further provides a chip. The chip includes a processor and a communication interface, the communication interface is coupled to the processor, and the processor is configured to run a program or an instruction to implement each process of the foregoing method embodiment, and same technical effect can be achieved. To avoid repetition, details are not described herein again.

It should be understood that the chip mentioned in this embodiment of this application may also be referred to as a system-level chip, a system chip, a chip system, or a system on chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements that are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or a compact disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A call processing method, applied to a terminal, wherein the method comprises:
   receiving a voice data packet sent by a network server; and
   sending first signaling to the network server in a case that the voice data packet is abnormal, wherein the first signaling is used to enable the network server to switch at least one of: a media server that generates the voice data packet or a domain for transmitting the voice data packet;
   wherein the domain for transmitting the voice data packet comprises:
   a PS domain for transmitting the voice data packet; or
   a CS domain for transmitting the voice data packet;
   the method further comprises:
   receiving second signaling sent by the network server, wherein the second signaling comprises at least one of: a switched media server that generates the voice data packet or a switched domain for transmitting the voice data packet; and
   receiving a CS call signaling sent by a second network element, wherein the CS call signaling is used to switch the transmission manner of the call data packet of the terminal to a CS domain for transmission.

2. The method according to claim 1, wherein the media server that generates the voice data packet comprises:
   a first media server that generates the voice data packet; or
   a second media server that generates the voice data packet.

3. The call processing method according to claim 1, wherein after the sending first signaling to the network server, the method further comprises:
   in a case that the second signaling comprises the switched domain for transmitting the voice data packet, receiving the voice data packet and sending the call data packet according to a transmission manner indicated by the second signaling, wherein the voice data packet is generated according to the call data packet.

4. A call processing method, applied to a network server, wherein the method comprises:
   receiving a call data packet sent by a terminal;
   generating a corresponding voice data packet according to the call data packet, and sending the voice data packet to the terminal; and
   in a case that first signaling sent by the terminal is received, switching at least one of: a media server that generates the voice data packet or a domain for transmitting the voice data packet;
   the switching at least one of: a media server that generates the voice data packet or a domain for transmitting the voice data packet comprises:
   receiving, through a CS domain, the call data packet sent by the terminal, and sending the voice data packet to the terminal through the CS domain;
   wherein the receiving, through a CS domain, the call data packet sent by the terminal, and sending the voice data packet to the terminal through the CS domain comprises:
   sending a first release instruction to a first network element corresponding to the PS domain, wherein the first release instruction is used to enable the first network element to release a network resource;
   receiving first reply information sent by the first network element, wherein the first reply information corresponds to the first release instruction; and
   sending preset information in a case that the first reply information is received, to switch a transmission manner of the call data packet of the terminal to the CS domain for transmission;
   wherein the preset information comprises a CS call instruction, and the sending preset information comprises:
   sending the CS call instruction to a second network element corresponding to the CS domain, wherein the CS call instruction is used to enable the second network element to send CS call signaling to the terminal, and the CS call signaling is used to switch the transmission manner of the call data packet of the terminal to the CS domain for transmission.

5. The call processing method according to claim 4, wherein the receiving a call data packet sent by a terminal comprises:
   receiving, through a PS domain, the call data packet sent by the terminal;
   the sending the voice data packet to the terminal comprises:
   sending, through the PS domain, the voice data packet to the terminal.

6. The call processing method according to claim 4, wherein the preset information comprises second signaling, and the sending preset information comprises:
   sending the second signaling to the terminal, wherein the second signaling is used to indicate a switched transmission manner of the voice data packet.

7. The call processing method according to claim 4, wherein the generating a corresponding voice data packet according to the call data packet comprises:
   sending the call data packet to a first media server, and receiving the voice data packet sent by the first media server; and
   the switching at least one of: a media server that generates the voice data packet or a domain for transmitting the voice data packet comprises:

sending the call data packet to a second media server, and receiving the voice data packet sent by the second media server.

8. The call processing method according to claim 7, wherein the sending the call data packet to a second media server comprises:

sending a second release instruction to the first media server, wherein the second release instruction is used to enable the first media server to release a network resource;

receiving second reply information sent by the first media server, wherein the second reply information corresponds to the second release instruction;

sending third signaling to the second media server in a case that the second reply information is received, wherein the third signaling is used to enable the second media server to get ready for receiving the call data packet;

receiving third reply information sent by the second media server, wherein the third reply information corresponds to the third signaling; and sending the call data packet to the second media server in a case that the third reply information is received.

9. A first electronic device, comprising a processor, a memory, and a program or an instruction that is stored in the memory and that can be run on the processor, wherein the program or the instruction, when executed by the processor, causes the first electronic device to perform:

receiving a voice data packet sent by a network server; and sending first signaling to the network server in a case that the voice data packet is abnormal, wherein the first signaling is used to enable the network server to switch at least one of: a media server that generates the voice data packet or a domain for transmitting the voice data packet;

wherein the domain for transmitting the voice data packet comprises:

a PS domain for transmitting the voice data packet; or a CS domain for transmitting the voice data packet;

the method further comprises:

receiving second signaling sent by the network server, wherein the second signaling comprises at least one of: a switched media server that generates the voice data packet or a switched domain for transmitting the voice data packet; and receiving a CS call signaling sent by a second network element, wherein the CS call signaling is used to switch the transmission manner of the call data packet of the terminal to a CS domain for transmission.

10. The first electronic device according to claim 9, wherein the media server that generates the voice data packet comprises:

a first media server that generates the voice data packet; or a second media server that generates the voice data packet.

11. The first electronic device according to claim 9, wherein after sending first signaling to the network server, the program or the instruction, when executed by the processor, causes the first electronic device to further perform:

in a case that the second signaling comprises the switched domain for transmitting the voice data packet, receiving the voice data packet and sending the call data packet according to a transmission manner indicated by the second signaling, wherein the voice data packet is generated according to the call data packet.

12. A second electronic device, comprising a processor, a memory, and a program or an instruction that is stored in the memory and that can be run on the processor, wherein when the program or the instruction is executed by the processor, the steps of the call processing method according to claim 4 are implemented.

13. A non-transitory readable storage medium, wherein the non-transitory readable storage medium stores a program or an instruction, and when the program or the instruction is executed by a processor, the steps of the call processing method according to claim 1 are implemented.

14. A non-transitory readable storage medium, wherein the non-transitory readable storage medium stores a program or an instruction, and when the program or the instruction is executed by a processor, the steps of the call processing method according to claim 4 are implemented.

15. A chip, comprising a processor and a communication interface, wherein the communication interface is coupled to the processor, and the processor is configured to run a program or an instruction to implement the steps of the call processing method according to claim 1.

16. A chip, comprising a processor and a communication interface, wherein the communication interface is coupled to the processor, and the processor is configured to run a program or an instruction to implement the steps of the call processing method according to claim 4.

* * * * *